(12) United States Patent
Juhl

(10) Patent No.: US 6,619,456 B1
(45) Date of Patent: Sep. 16, 2003

(54) LOCKABLE FREE-WHEELING TOWING ADAPTER

(76) Inventor: Barker J. Juhl, 1431 22nd Ave. N., Saint Petersburg, FL (US) 33704

( * ) Notice: Subject to any disclaimer, the term of this patent is extended or adjusted under 35 U.S.C. 154(b) by 22 days.

(21) Appl. No.: 10/038,705

(22) Filed: Jan. 2, 2002

(51) Int. Cl.[7] ................................................ F16D 11/04
(52) U.S. Cl. .................................................. 192/69.43
(58) Field of Search ........................... 192/69.43, 69.91, 192/93 A, 95; 403/1; 301/9.2, 35.629

(56) References Cited

U.S. PATENT DOCUMENTS

| | | | | |
|---|---|---|---|---|
| 1,055,626 A | * | 3/1913 | Foss ..................... | 192/69.91 X |
| 1,500,333 A | * | 7/1924 | Putnam ................. | 301/35.629 |
| 2,410,579 A | * | 11/1946 | Haag ...................... | 301/9.2 |
| 2,874,814 A | * | 2/1959 | Beck ..................... | 403/1 |
| 2,970,008 A | * | 1/1961 | Leach ............... | 301/35.629 X |
| 3,351,364 A | * | 11/1967 | Warn et al. ................ | 403/1 |
| 3,442,361 A | * | 5/1969 | Hegar ..................... | 403/1 |
| 4,029,423 A | * | 6/1977 | Sager ..................... | 403/3 |
| 4,089,610 A | * | 5/1978 | Kleespies et al. .......... | 403/1 |
| 4,337,003 A | | 6/1982 | Juhl | |
| 4,453,852 A | | 6/1984 | Gilcrest | |
| 4,610,558 A | | 9/1986 | Erickson | |
| 4,856,633 A | * | 8/1989 | Specht ..................... | 192/69 |
| 6,238,009 B1 | * | 5/2001 | Lovitt, Jr. .............. | 301/35.629 |

* cited by examiner

Primary Examiner—Richard M. Lorence
(74) Attorney, Agent, or Firm—David Kiewit

(57) ABSTRACT

An adapter assembly mounted on a road vehicle between a driving axle and a road wheel allows a user to selective either a driving configuration, for use when the vehicle is to be driven or a free-wheeling configuration, for use when the vehicle is to be towed. Such an adapter may comprise a spindle, a hub, a spring-biased locking gear, a set of pushrods and a cam that can oscillate about the spindle. The locking gear has a splined periphery for engaging a splined internal portion of the hub and a splined axial throughhole for engaging a splined portion of the spindle. When the cam is turned in one direction the pushrods push the locking gear into the driving configuration in which the gear connects the hub to the spindle when the splined periphery engages the hub and the splined throughhole engages the spindle. When the cam is turned in the other direction, the bias spring pushes the locking gear outwards from the vehicle into the free-wheeling configuration in which the gear does not connect the hub and spindle

5 Claims, 3 Drawing Sheets

LOCKABLE FREE-WHEELING TOWING ADAPTER

BACKGROUND OF THE INVENTION

1. Field of the Invention

The invention generally relates to mechanisms for providing a selective hub to axle connection, and more specifically to a selectively lockable free-wheeling device for installation between a driven axle and a road wheel of a vehicle to be towed with its drive wheels on the ground.

2. Background Information

A road vehicle that is towed with all four wheels on the ground may incur damage to its transmission, a risk that is particularly severe in the case of cars having automatic transmissions. One approach to avoiding this problem is to install a free-wheeling device of some sort between a driven axle and at least one of the wheels. Those skilled in the vehicular arts will recognize that differential gearing of conventional sorts (i.e., non-limited slip) between the two wheels on a driven axle allows devices of this sort to be installed on only one of the two wheels on an axle. Moreover, although the disclosure herein is expressed in convention terms of "a driven axle", those skilled in the vehicular arts will recognize that the same properties attributed to a driven axle are equally well attributable to a front wheel drive vehicle having two half-shafts comprising the equivalent of an "axle".

An adapter mechanism of this sort, which allowed for conversion between a free-wheeling and a driven configuration was taught by the inventor in his U.S. Pat. No. 4,337,003, the disclosure of which is herein incorporated by reference. Although the arrangement taught in the inventor's earlier patent allowed for conversion without having to remove the adapter mechanism or the road wheel, it did require changing wheel bolts. Short bolts were used to fasten the wheel to an outer flange of the adapter when in the free-wheeling configuration and longer, thinner bolts were used to attach the outer flange to the axle flange when the wheel was in the driven configuration.

In U.S. Pat. No. 4,610,558 Erickson described a self-contained adapter assembly that allowed a user to selectively place the attached road wheel into either of a driven or a free-wheeling configuration by turning a knob on the outboard end of the apparatus. The act of turning the knob caused two splined members in Erickson's adapter to either engage for driving or to disengage for free-wheeled towing. Erickson placed his splined connectors, which had to sustain the driving torque applied to the road wheel when engaged, at the outboard end of his mechanism. In order for Erickson's splined connection to be strong enough to sustain the torque it had to be relatively large, which increased the size of the surrounding hub sub-assembly enough that special wheels with oversize central openings sometimes had to be used when a small automobile was to be equipped with the adapter. The use of an increased central hole diameter can result in an unacceptably weakened road wheel.

In U.S. Pat. No. 4,453,852 Gilchrist discloses a hub disengaging apparatus for use on an agricultural machine having a power shaft that is axially shiftable between a driving position, in which the power shaft engages planetary transmission gears within a hub assembly, and a free-wheeling position that is selected when the machine is to be towed on a road.

When one of two drive wheels on an axle is moved outwardly by bolting an adapter between the vehicle's wheel flange and the road wheel a tracking error is introduced. This offset can sometimes be compensated by installing either a second adapter or a dummy axle extension on the second side of the vehicle. In addition to tracking concerns, an adapter supplier must be concerned with the limited extent of axial outward displacement of a road wheel that can be made before encountering a significant problem of interference between a tire and a fender. In some prior art towing adapters the overall axial displacement is controlled by decreasing the axial distance between inner and outer adapter bearings, which increases side loads on the bearings and decreases their service life.

BRIEF SUMMARY OF THE INVENTION

A preferred embodiment of the invention provides an adapter assembly for mounting on a road vehicle driving axle and for receiving a road wheel. This adapter assembly may be selectively set into one of a driving configuration and a free-wheeling configuration This preferred embodiment comprises a spindle, a hub, a spring-biased locking gear, a set of pushrods and an actuating member. The preferred spindle has a mounting flange at or near its inboard end and a shaft that has an axis extending substantially perpendicularly outboard from the mounting flange. The preferred shaft includes a splined portion adjacent the flange and an axially grooved portion outboard of the splined portion. The preferred hub is rotatably mounted on the spindle's shaft and comprises a wheel flange for receiving a wheel and a sleeve having a splined portion along its inner surface. A spring fitting about the shaft and disposed between the flange and the splined portion of the shaft is used to bias an annular locking gear away from the flange. The preferred annular locking gear has a splined periphery for engaging a splined internal portion of the sleeve and a splined axial throughhole for engaging the splined portion of the shaft, so that the locking gear connects the sleeve to the shaft in the driving configuration when the splined periphery engages the sleeve and the splined throughhole engages the shaft. The preferred adapter also comprises at least two pushrods fitting into respective axial grooves in the shaft so that a respective inboard portion of each pushrod can be used to engage an outboard surface of the locking gear and so that a respective outboard end of each pushrod can be moved by a cam member that comprises a cam surface oblique to the axis of the shaft. The preferred cam member is mounted on the shaft for oscillation about its axis between a free-wheeling selection position, in which the cam surface does not push on the outboard ends of the pushrods, and a drive selection position, in which the cam surface engages the at least two pushrods and pushes them into engagement with the outboard surface of the locking gear so that the locking gear is urged into the driving configuration against the force of the spring.

A feature of a preferred embodiment of the invention is that the torque-sustaining portions of the apparatus are located between two bearings and are relatively close to the inboard end of the spindle. Because the outboard portions of the preferred apparatus do not have to sustain a wheel-driving torque, they can be smaller, so that the preferred apparatus can be used with substantially all standard vehicle road wheels without requiring the wheel to be weakened by having its central throughhole opened up. A particular preferred embodiment, for example, has an outer hub sleeve diameter of no more than 2⅛ inches.

Another feature of preferred embodiments of the invention is that although a portion of the shifting mechanism is adjacent to the outboard end of the spindle, much of the shifting mechanism is located closer to the inboard end of the spindle and in the space between two wheel bearings. This arrangement allows for relatively widely spaced bearings, which reduces end loading effects and is expected to increase the service life of the adapter apparatus beyond that characteristic of some prior art devices.

In some cases the towing adapter of the invention may be installed with a modified road wheel having a conical web that compensates for the axial offset introduced by the adapter. In particular, this may involve apparatus for mounting on an automobile driving axle, the apparatus comprising, in combination, a road wheel and an adapter assembly selectively set into either of a driving configuration and a free-wheeling configuration. The composite apparatus is characterized in that: the adapter assembly comprises a mounting flange for attachment to the driving axle and a wheel flange for attachment to the road wheel, where the mounting flange and the wheel flange are spaced apart by a predetermined axial distance. The road wheel comprises a flat annular portion for attachment to the wheel flange, a tire-receiving rim portion, and a conical web portion extending between the flat annular portion and the tire-receiving portion so as to provide the predetermined axial distance between the flat annular portion and a central plane of the rim, whereby the central plane of the rim is coplanar with the mounting flange when the road wheel is attached to the wheel flange.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 4 is an elevational detail view of a preferred cam member.

FIG. 6 is an elevational detail view of a preferred pushrod.

DETAILED DESCRIPTION OF THE INVENTION

Figure 1:
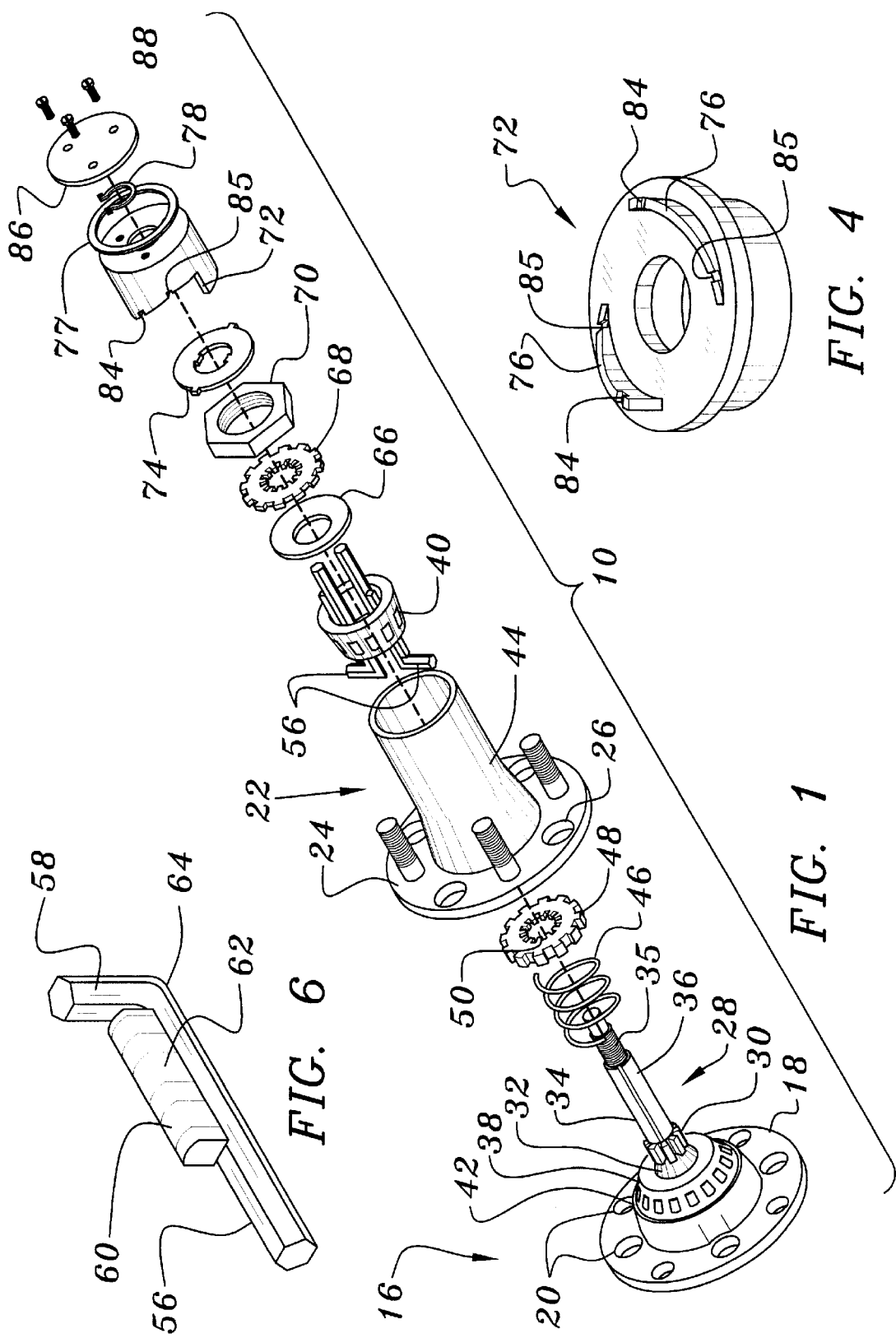
FIG. 1 is an exploded view of a preferred embodiment of the invention.
Figure 7:
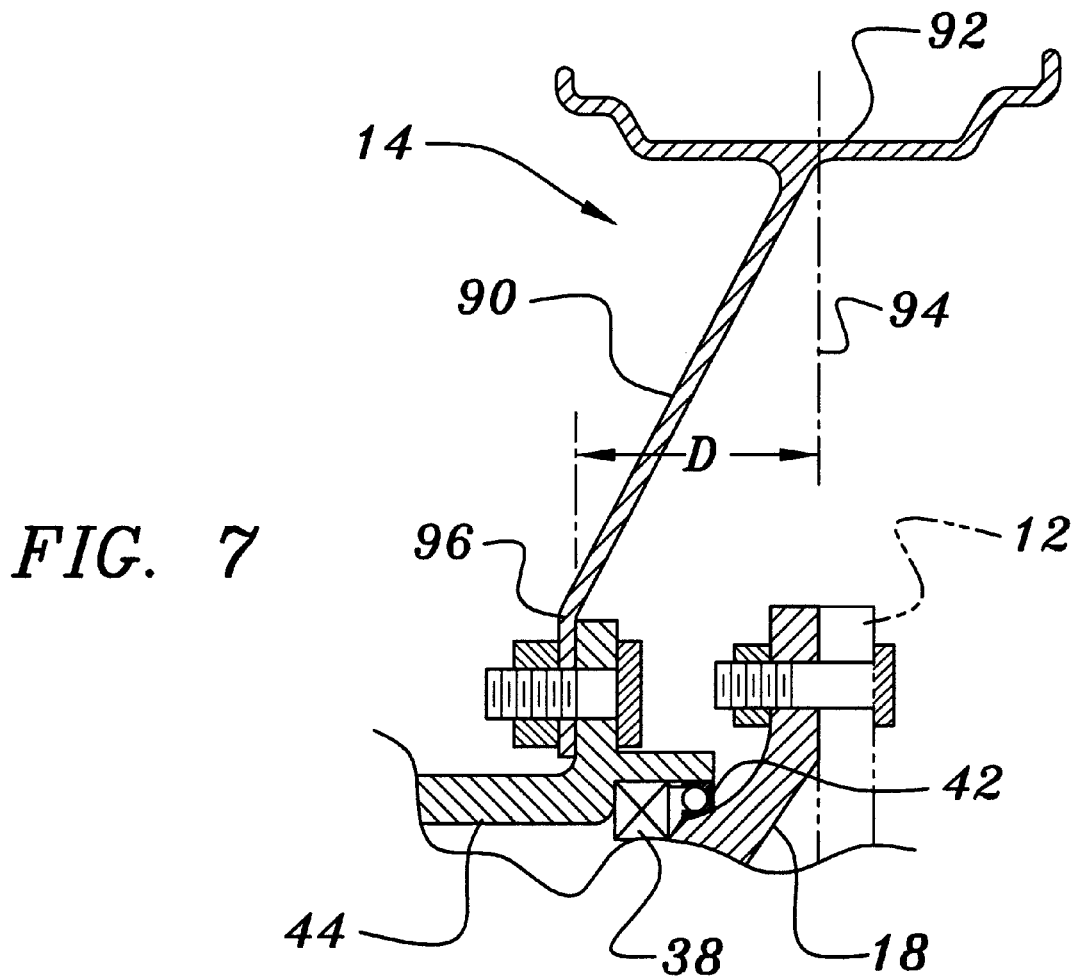
FIG. 7 is a partial cross-sectional view of an optional coned road wheel that can be used with a towing adapter of the invention to retain the normal wheel track setting.

An exploded view of a preferred lockable free-wheeling towing adapter 10 appears as FIG. 1. The apparatus 10, like prior art adapters, is intended to be interposed between a wheel-attachment flange 12 of a vehicle and a road wheel 14, as seen in FIG. 7. In the depicted embodiment a flanged spindle 16 comprises a mounting flange portion 18 having a plurality of throughholes 20 used to bolt the adapter 10 to the vehicle. In a preferred embodiment, the throughholes may be configured as several subarrays so that a single adapter can be used, for example, with either of two commonly encountered four-bolt that have different bolt circle radii. A hub 22 comprises a wheel flange portion 24 to which the road wheel 14 may be attached. In a preferred embodiment the wheel flange 24 may comprise one or more enlarged throughholes 26 that an installer can use to access lug nuts used to attach the spindle flange 18 to the vehicle. Although the vehicle forms no part of the present invention, the following detailed description of the invention will sometimes refer to the placement of various items along an axis of the spindle by using the words "inboard" and "outboard" in the sense of the items being either closer to, or more removed from, respectively, the mounting flange 18, which abuts the vehicle when the adapter 10 is installed thereon.

A preferred spindle 16 comprises a shaft portion 28 having an axis extending substantially perpendicularly outboard from a center of the mounting flange 18. The preferred shaft 28 comprises at least a splined portion 30 that may be spaced apart from the mounting flange 18 by a generally smooth tapered region 32, and a grooved portion 34 that is at least partially outboard of the splined portion 30. The shaft 28 also comprises a threaded portion 36, which may be partly or entirely disposed on the grooved portion, and which is used to retain bearings 38, 40, as is commonly done with automotive wheel spindles.

Figure 2:
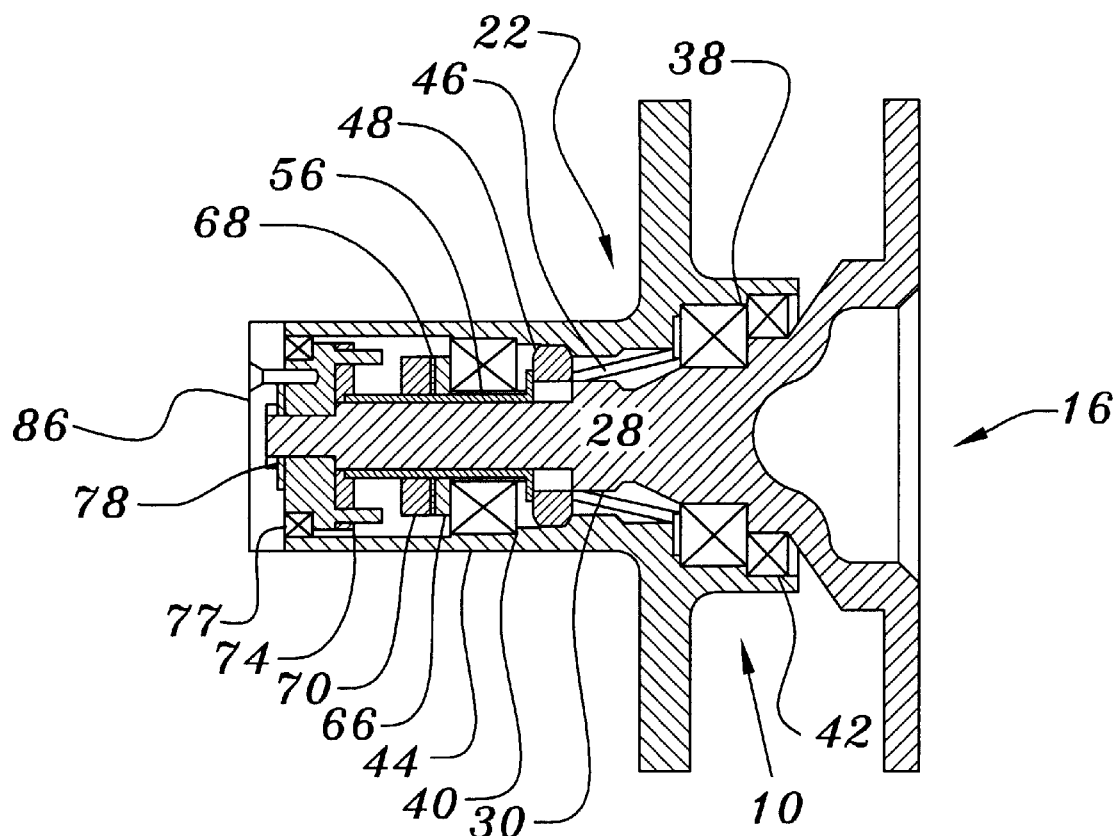
FIG. 2 is a cross-sectional view of a preferred embodiment of the invention in a free-wheeling configuration, the section taken in a plane containing the shaft axis and both of two pushrods.
Figure 3:
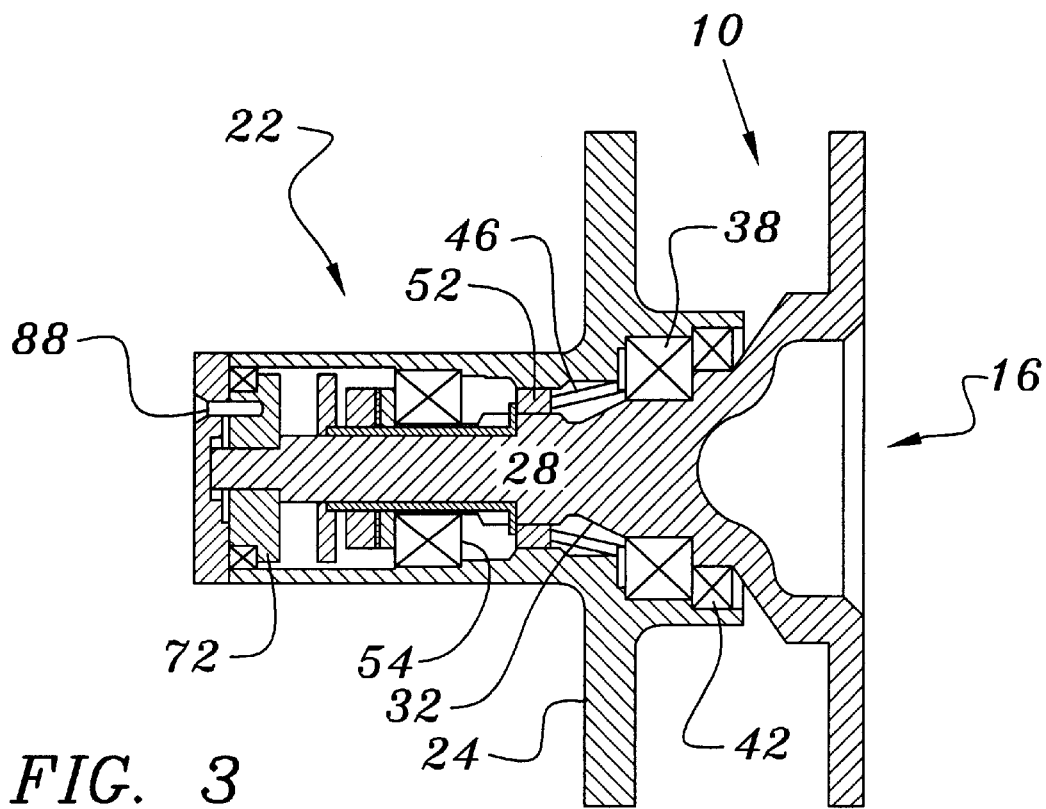
FIG. 3 is a cross-sectional view identical to that of FIG. 2, save that the apparatus is in a drivable configuration.

The preferred adapter 10 is assembled by initially inserting an outer race portion of an inboard bearing 38 into the sleeve portion 44 of the hub 22. A locking gear 48 and spring 46 are then inserted into the hub sleeve 44, followed by the rotatable portion of the inboard bearing 38 and an inboard oil seal 42. The spindle 16 and hub are then aligned so that splines in the axial throughhole 50 of the locking gear 48 engage the shaft splines 30. In the preferred embodiment the locking gear 48 is always engaged with the shaft splines 30 and is urged by the spring 46 into a free-wheeling configuration in which the locking gear does not engage an internal splined portion 52 of the hub sleeve 44, as depicted in FIG. 2. In this preferred arrangement, the outboard motion of the locking gear 48 is limited by the inboard face 54 of the rotatable portion of the outboard bearing 40. Those skilled in the art will recognize that other mechanical arrangements are possible in which a locking gear selectively either engages both of an internally splined sleeve and an externally splined shaft so as to lock them together in a driving configuration, or does not engage at least one of the two splined surfaces so as to allow the hub to free-wheel about the shaft.

After the hub 22 and spindle 16 have been assembled together, two or more pushrods are inserted into respective grooves in the axially grooved portion 34 of the shaft. In a preferred embodiment the pushrods 56 are generally ell-shaped so as to provide respective inboard ends extending radially outward far enough away from the axis of the shaft 28 to stick out beyond the grooves and to engage respective portions of the locking gear. The axially-oriented portions of preferred pushrods that are disposed within the outboard bearing 40 do not, of course, extend radially outward from the groove. Instead, they have a size and shape selected so that they can fit precisely within the grooves and so that a curved bearing surface 60 of the pushrods is aligned with the surface of the shaft 28 to provide a smooth composite cylindrical surface that the outboard bearing 40 can be pressed onto. An arrangement of this sort minimizes bearing wear. For example, a prototype version of the apparatus 10 employed two pushrods, each of which was made by attaching a shim portion 62 to an Allen wrench 64. Those skilled in the mechanical arts will recognize that the selection of a pushrod having a hexagonal cross-section was a matter of mere convenience and that a rectangular cross section may be used. Many other pushrod arrangements are possible that provide a pushing element having an inboard end 58 for engaging a locking gear and an outboard end that can be selectively engaged by a cam member when the locking gear is to be pushed axially inboard along the shaft. Moreover, more than two such pushrods can be used in practicing the invention.

Returning again to the preferred assembly sequence, after the pushrods 56 have been installed, the outboard bearing 40 is pressed lightly onto the bearing surface portion of the shaft 28 and is secured position by the well-known combination of a thrust washer 66 (which may be keyed to a groove in the shaft), a lock washer 68, and a bearing nut 70. This results in an assembly having a locking gear 48 slidingly disposed on a splined portion 30 of the shaft between the inner 38 and outer 40 bearings so that the gear 48 can be pushed into a driving configuration against the biasing force of the spring 46 by means of the pushrods 56 that essentially reach through the outboard bearing 40 to engage the gear.

Figure 5:
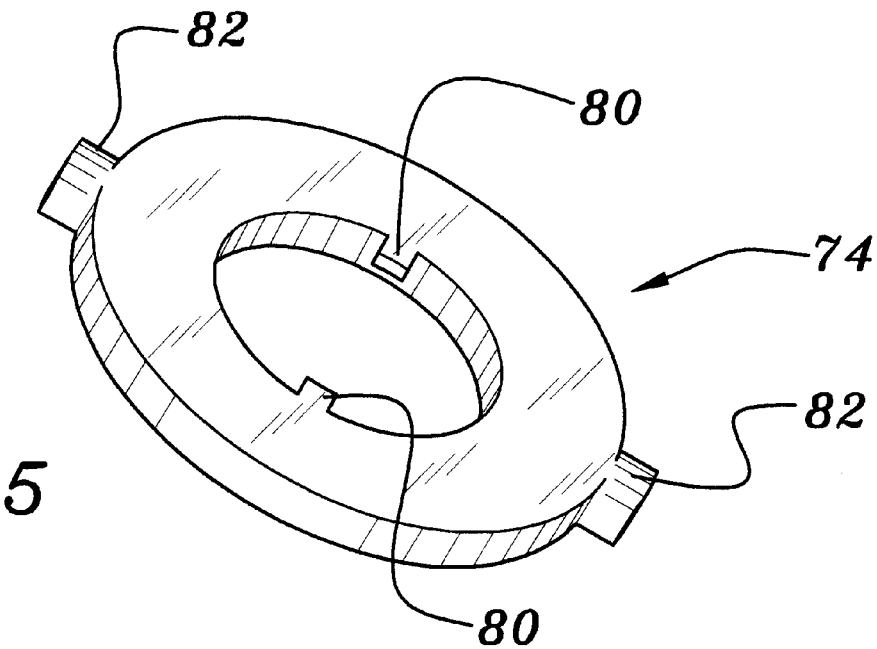
FIG. 5 is an elevational detail view of an actuator washer.

In the preferred adapter assembly, the pushrods 56 are pushed inboard by means of an axial cam member 72 and an actuator washer 74. The preferred cam member 72 is mounted on a reduced diameter end portion 35 of the shaft for oscillation about the axis of the shaft 28, and comprises a pair of ramp-like cam surfaces 76. Although one could choose to have an outboard end of a pushrod bear directly on a respective cam surface, a preferred embodiment of the invention interposes an actuating washer 74 between the pushrods 56 and the cam surfaces 76. An advantage of this arrangement is that it allows the cam surface 76 to be radially farther from the axis of the shaft than are the pushrods, which makes the cam surfaces 76 easier to fabricate and which also reduces the effort that a user must supply in turning the cam member 72. A preferred actuating washer 74 comprises internal tabs 80 for engaging the outboard ends of the pushrods 56 and peripheral tabs 82 for bearing on the cam surfaces 76. In a preferred embodiment depicted in FIG. 5 the peripheral tabs are rounded on the surfaces that contact the cam surfaces, and the internal tabs do not extend through the entire thickness of the actuating washer 74. This ensures better capture of the outboard ends of the pushrods 56.

Outboard of the cam member 72, the preferred adapter 10 has an outboard seal 77, a locking clip 78 for holding the cam member 72 and actuating washer 74 at the desired axial spacing, and a knurled cap 86 that may be held to the cam member 72 by means of screws 88 or other suitable fasteners. A user can then turn the cap in one direction to push the locking gear into the driving configuration, and can turn the cap in the opposite direction to allow the spring 46 to push the locking gear into the free-wheeling configuration.

It is clearly desirable that any such adapter remain in whichever one of driving and free-wheeling configurations that the user has selected. In particular, it is important that when the adapter 10 is placed in the driving configuration, that it remain there and that it not accidentally slip into the free-wheeling configuration. To assure that the apparatus remains in the selected state, a preferred embodiment provides several additional features on the cam member 72. A first small notch 84 adjacent the top of each cam ramp 76 aids in holding the pushrods in the driving configuration, and prevents the actuating washer tabs from sliding down the ramps under the influence of the bias spring 46. Correspondingly, a second small notch 85 adjacent the bottom of each cam ramp 76 aids in retaining the mechanism in the free-wheeling configuration. Moreover, the direction of rise of the cam surfaces 76 is selected so that braking-induce torque does not act to shift the adapter into the free-wheeling configuration. Thus, a preferred adapter 10 of the invention intended for use on the left-hand side of a vehicle will have ramps 76 arranged in accordance with the depiction of FIG. 4 and will be shifted into the driving, or lock-up, configuration by a user who faces the road wheel and who turns the cap 86 in a counter-clockwise direction. Correspondingly, an adapter for use on the right-hand side of a vehicle is locked up by a user who is facing the outside of the road wheel and who turns the respective cap clockwise.

Installing an adapter of the invention 10 acts to displace a road wheel 14 outboard by some amount, indicated as "D" in FIG. 7, which is commonly on the order of 5 cm. This alters the wheel track and the driving characteristics of the vehicle and, if the vehicle has a relatively tight spacing between the wheel and fender, can cause the wheel to rub the fender, e.g., during tight turns. Thus, it is expected that in some applications of the adapter of the invention a single adapter (e.g., on the driver's side of the vehicle) will be used alone. In other cases (e.g., when the driven axle of the vehicle is driven by a limited slip differential so that both drive wheels must be switched between free-wheeling and driven configurations), two adapters will be used and the wheel track of the driven axle will be increased by 2D. In yet other situations, in which the operator does not want to drive the vehicle with an asymmetric track on the drive axle, one may install an adapter on one side of the car and a dummy spacer on the other.

Yet other arrangements for dealing with driven wheel offsets can be provided by the use of a drive wheel 14 having a coned web portion 90, as depicted in FIG. 7. Here, a wheel 14, which has the usual flat annular portion 96 for bolting to a flange, is made with a conical web 90 having an apex angle selected to compensate for the adapter offset D by shifting the wheel rim 92 the same distance in the direction opposite that imposed by the adapter offset so that the center of the rim is aligned, as indicated by a centerline 94 in FIG. 7, with the outer face of the wheel attachment flange 12. When a wheel with a coned web 90 is combined with the adapter of the invention 10 there is no net effect on the wheel track of the driven axle, so that a user can have the convenience of being able to selectively shift the vehicle between a driving and a free-wheeling configuration without having to put up with a tracking error.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An adapter assembly for mounting on a road vehicle driving axle and for receiving a road wheel, the adapter assembly selectively set into one of a driving configuration and a free-wheeling configuration, the adapter assembly comprising:

a spindle comprising a mounting flange adjacent an inboard end thereof and a shaft having an axis extending substantially perpendicularly outboard from the mounting flange, the shaft comprising a splined portion adjacent the flange and an axially grooved portion extending outboard of the splined portion;

a hub rotatably mounted on the shaft, the hub comprising a wheel flange for receiving a wheel and a sleeve having a splined portion along an inner surface thereof;

a spring fitting about the shaft adjacent the mounting flange;

an annular locking gear having a splined periphery for engaging the splined portion of the sleeve and having a splined axial throughhole for engaging the splined portion of the shaft, the locking gear connecting the sleeve to the shaft in the driving configuration when the splined periphery engages the sleeve and the splined throughhole engages the shaft, the locking gear urged away from the flange by the spring into the freewheeling configuration in which it does not engage at least one of the shaft and the sleeve;

at least two pushrods, each of the pushrods having a respective inboard portion for engaging an outboard surface of the locking gear and a respective outboard end, each of the pushrods fitting into a respective axial groove in the shaft; and a cam member comprising a cam surface oblique to the axis of the shaft, the cam member mounted on the shaft for oscillation thereabout between a free-wheeling selection position in which the cam surface does not engage the outboard end of any of the at least two pushrods, and a drive selection position, in which the cam surface pushes the at least two pushrods into engagement with the outboard surface of the locking gear so that the locking gear is urged into the driving configuration against the force of the spring.

2. The adapter of claim 1 wherein the locking gear engages the shaft, but not the sleeve, when in the free-wheeling configuration.

3. The adapter of claim 1 wherein the shaft is journaled within the sleeve by an inboard bearing adjacent the mounting flange and inboard of the locking gear; and an outboard bearing adjacent the cam member and outboard of the locking gear.

4. The adapter of claim 1 further comprising an actuating washer abutting the cam member and the respective outboard ends of each of the at least two pushrods when the adapter is in the driving configuration.

5. The adapter of claim 1 wherein each of the pushrods comprises a respective inboard end portion extending radially outward from a respective axial groove, each of the pushrods further comprising a respective axially-oriented portion that does not extend radially outward from the respective axial groove.

* * * * *